Jan. 19, 1965
A. CHAUSSON
3,165,955
BOX CUTTING MACHINE
Filed July 28, 1960
6 Sheets-Sheet 1
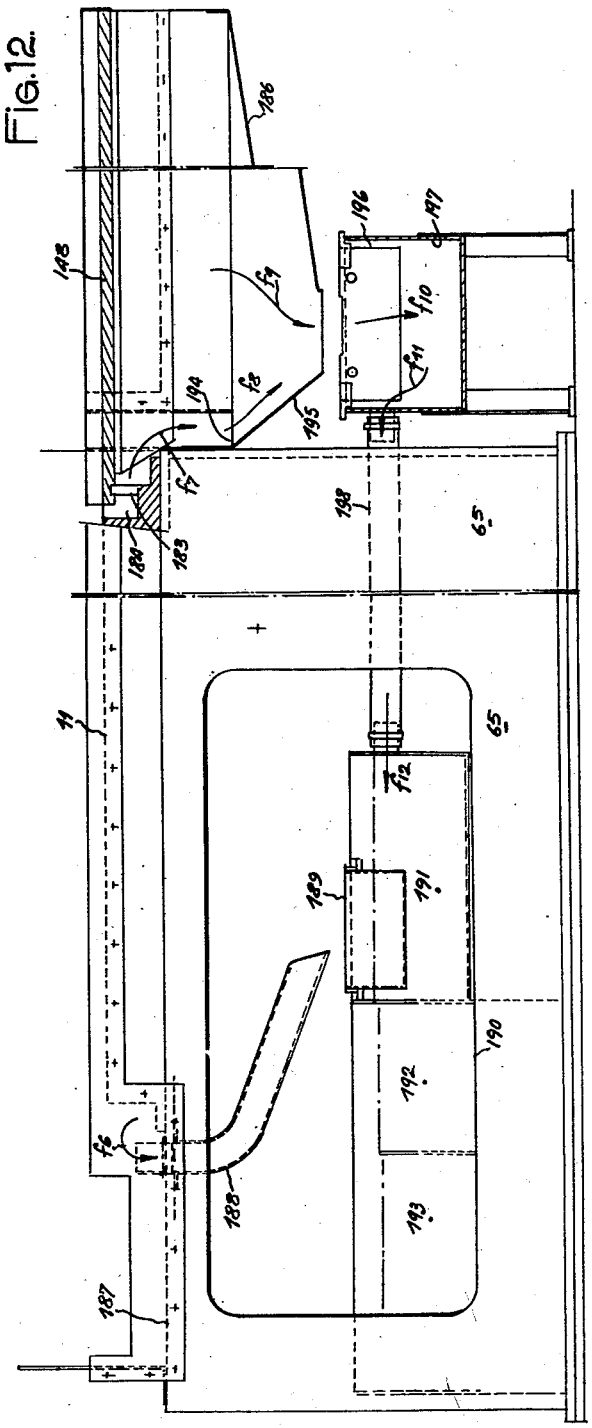
INVENTOR
ANDRÉ CHAUSSON

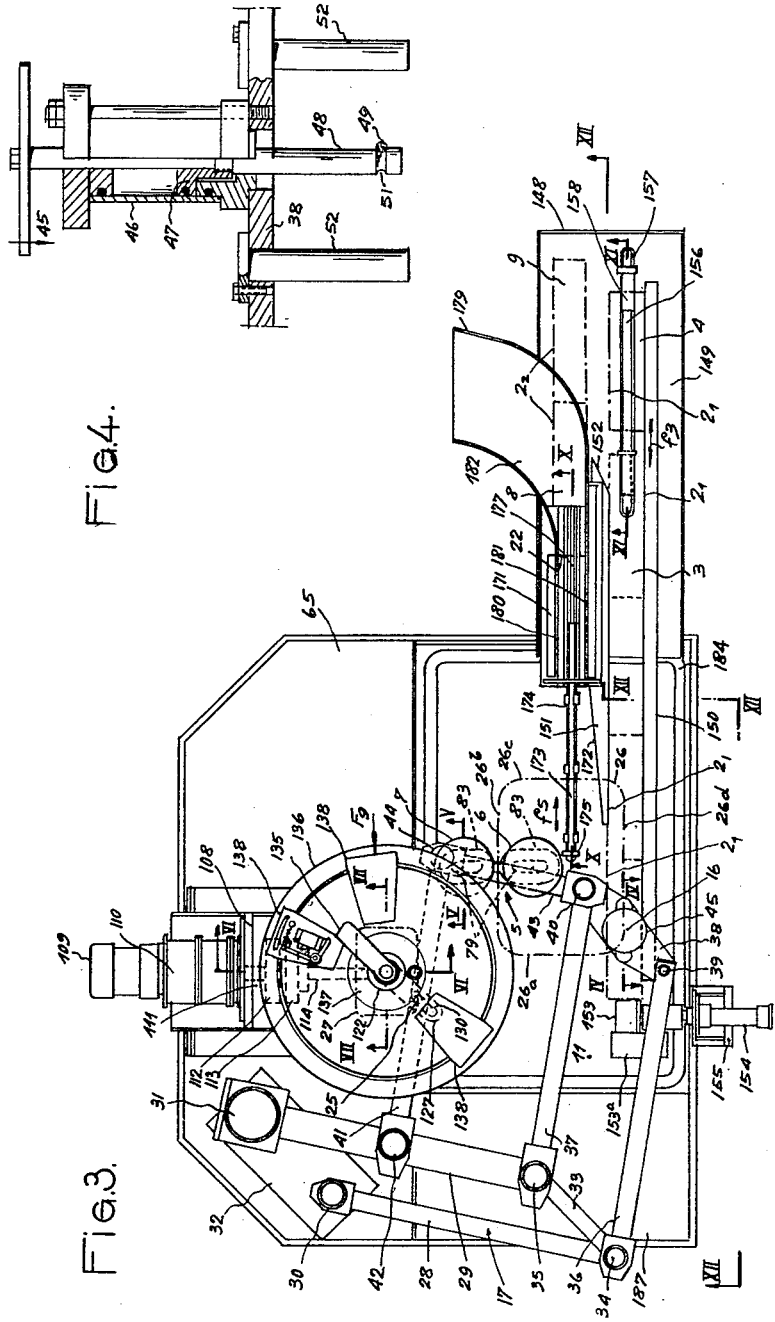

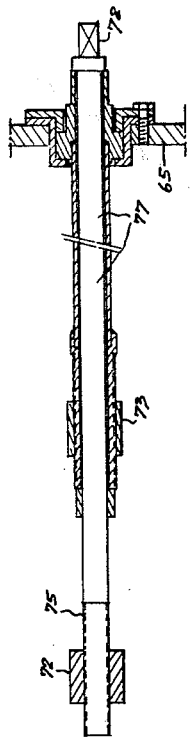
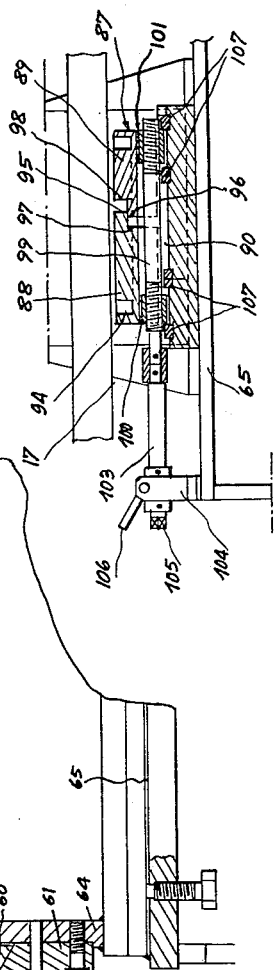
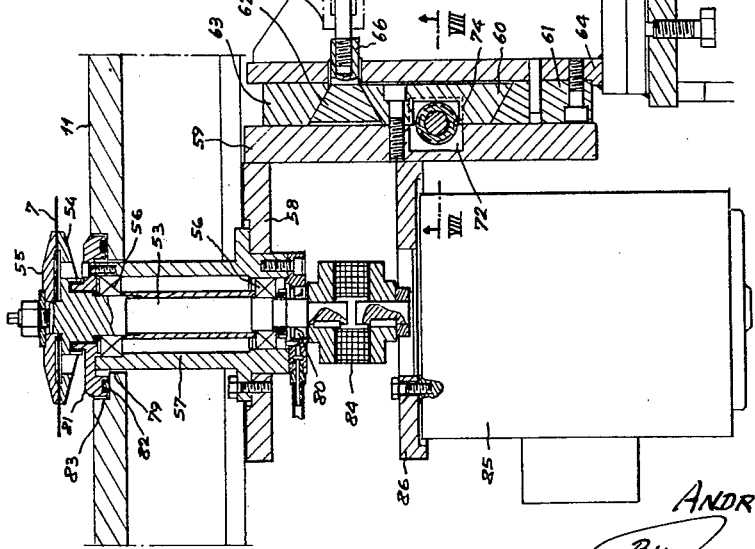

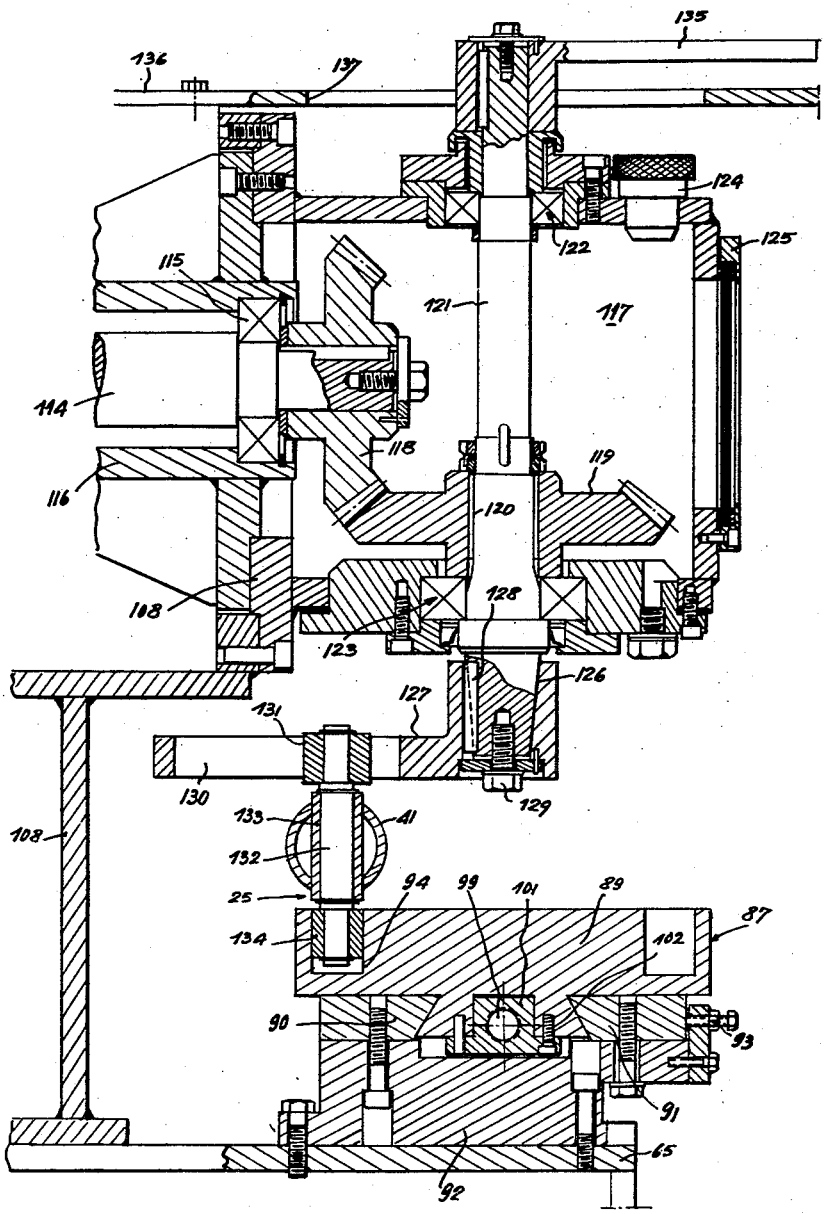

Jan. 19, 1965  A. CHAUSSON  3,165,955
BOX CUTTING MACHINE
Filed July 28, 1960  6 Sheets-Sheet 5
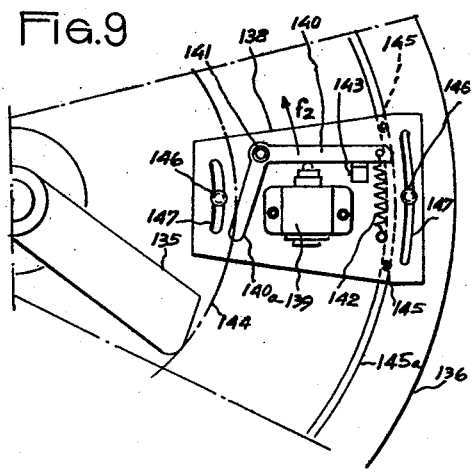
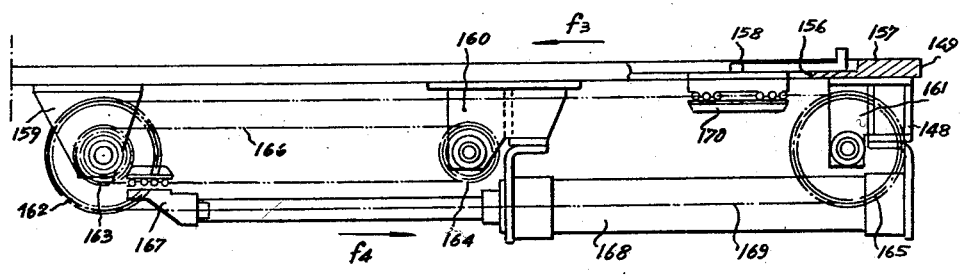
INVENTOR
ANDRÉ CHAUSSON

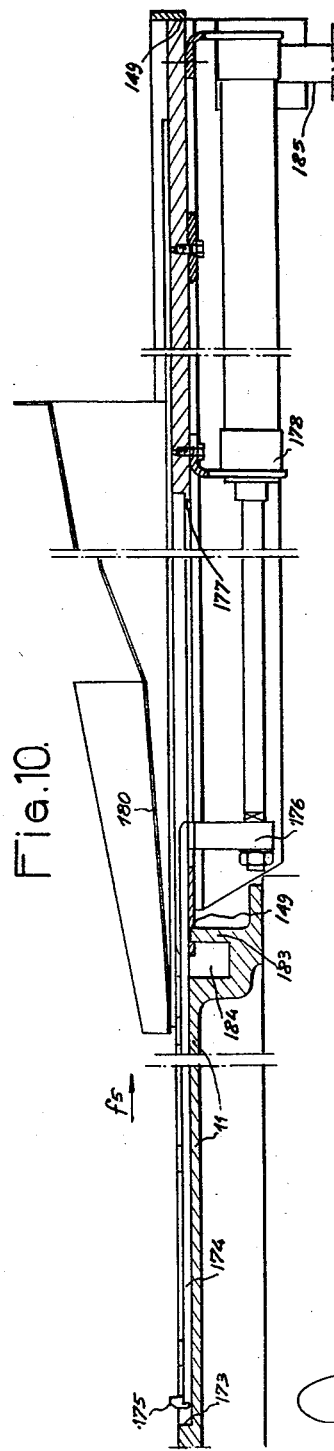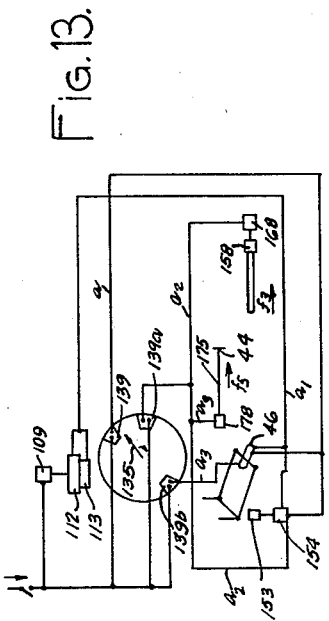

3,165,955
BOX CUTTING MACHINE
André Chausson, Asnieres, France, assignor to Societe
  Anonyme des Usines Chausson, Asnieres, France, a
  company of France
Filed July 28, 1960, Ser. No. 45,963
3 Claims. (Cl. 83—151)

The invention relates to a machine for cutting various parts. This machine is more especially devised for carrying out at a rapid rate, with accuracy and safety, the cutting of radiator water boxes, which involves the creating of a machine whose operational cycle is entirely automatic.

The invention has for its primary object the provision of automatic apparatus enabling the operator to spend his full, or nearly full, time merely feeding and removing the work pieces.

According to the invention, the machine for cutting radiator water boxes is characterised in that it comprises a reproducing apparatus one of whose elements is subjected to a template defining the movement that must be followed by a second and driven element of the apparatus, this second element supporting a member for seizing and moving work boxes along a trajectory including at least one sawing point, the apparatus then conveying the cut box to an evacuation point.

Various other characteristics of the invention will moreover be revealed by the detailed description which follows.

One form of embodiment of the purpose of the invention is shown, by way of example, in the attached drawings.

FIGURE 1 is a longitudinal elevation, partly cut away, of holding equipment for a stamped box to be cut.

FIGURE 2 is a side elevation of this equipment, taken in the direction of the arrow $F_2$.

FIGURE 3 is a plan view of the machine according to the invention.

FIGURE 4 is a section taken on a larger scale, along the line IV—IV of FIGURE 3.

FIGURES 5 to 7 are sections respectively taken along the lines V—V to VII—VII of FIGURE 3, showing, on a larger scale, the parts forming the machine.

FIGURE 8 is a partial section taken along the line VIII—VIII of FIGURE 5.

FIGURE 9 is a plan view similar to FIGURE 3 showing, on a larger scale, a detail of the machine denoted by the arrow $F_9$ in that figure.

FIGURES 10 and 11 are sections taken along the lines X—X and XI—XI of FIGURE 3, showing, on a larger scale, elements of the machine.

FIGURE 12 is an enlarged side elevation, partially cut away, taken along the line XII—XII of FIGURE 3.

FIGURE 13 is a diagram of electrical or fluid pressure circuits controlling automatic operation of the machine.

FIGURES 1 and 2 show a holding tool for stamped parts 1 to be cut. In the example shown, the stamped parts may comprise radiator water boxes to be subsequently welded on the collectors of a nest forming a radiator. This tool comprises a certain number of rectangular shoes 2, all identical, on which the boxes 1 are placed in inverted condition. The number of shoes required for ensuring the continuous working of the machine is determined, on the one hand, by the number of shoes $2_1$, FIG. 3, positioned on a runway 3 from a loading point 4 up to a work point 5 defined by two saws 6 and 7, and on the other hand, by the number of shoes $2_2$ positioned on an evacuation way 8 for cut boxes extending from the work point 5 towards a storage area 9. Thus, according to the form of embodiment shown in FIGURE 3, the number of shoes required is at least equal to seven.

Each shoe comprises a flat rectangular sole 10 (FIGURES 1 and 2) whose base surface is provided for ensuring smooth sliding on the upper plane surface of the tray 11, FIGS. 10 and 12 of the machine which is suitably lubricated by means, for example, by the cutting liquid directed on to the saws 6 and 7. On the sole 10 a plate 12 is attached which has chamfered edges and which is cut to the template of the border of the water box 1 intended to be carried by the shoe. 13 denotes a deep peripheric groove cut in the plate 12 for allowing the passage of the saws 6 and 7 extending at the level of this groove and intended to cut the lower portion of the water box 1. The position at which the water box is cut is determined by centering elements 14 and 15 supported by the plate 12.

The holding tools for water boxes 1 also comprise caps 16 moved, as described farther on, by a vertically movable guiding device generally designated by reference 17. Each cap (FIGURES 1 and 2) consists of a support plate 18 integral with a fixing bushing 19 and two centering journals 20 intended to provide a rigid connection with the guiding device 17. The plate 18 supports, by means of compression springs 21 and screws 22, centering counterparts 23 and 24 having working portions shaped correspondingly to the water boxes fitted on elements 14, 15. These counterparts are intended to hold on each shoe 2, the corresponding water box 1 when the cap 16, supported by the device 17, is down. The springs 21, inserted between the counterparts 23 and 24 and the plate 18, form an elastic cushion supplying a steady holding pressure to the water boxes, the retaining screws 22 of the counterparts 23 and 24 being guided in the plates 18 so as to control the displacement of these counterparts.

The guiding device 17 of the holding tools for water boxes 1 is formed essentially (FIGURE 3) by a pantographic machine supporting feeler 25 (FIGURE 3) and the tool cap 16, so that the displacements applied to the feeler 25 are homothetically converted by the pantographic machine, the trajectory 26 of the cap being enlarged in proportion to the trajectory 27 of the feeler. The pantographic machine 17 comprises two bars 28 and 29 of equal length, respectively pivoted at 30 and 31 on a support 32 carried by the frame of the machine and held parallel by means of a bar 33 pivoted at 34 and 35 on the free ends of the bars 28 and 29. Two other bars 36 and 37 of equal length are also connected to the joints 34 and 35 so as to be able to pivot independently of the bars ending at these joints. The bars 36 and 37 are kept parallel by another bar 38 of the same length as the bar 33, which is pivoted at 39 and 40 on the free ends of said bars 36 and 37. Thus, there are two adjacent deformable parallelograms: the first comprising the support 32 and the bars 28, 29 and 33, the second, the bars 33, 36, 37 and 38. These two deformable parallelograms are connected by a third adjacent deformable parallelogram comprising the bar 37, a part of the bar 29, a bar 41, pivoted at 42 on the latter and of equal length to that of the bar 37, lastly a bar 43 equal to part of the bar 29 comprised between the joints 35 and 42 and pivoted at 40, 44 on the bars 37, 41. This latter bar 41 supports at its middle part, the feeler 25, whereas the bar 38, forming a small plate, supports a member 45 actuating the cap 16.

The panatographic machine 17 is placed above the tray 11 and in a horizontal plane. This results in a considerable overhang of all the bars of said pantographic machine which is subjected to the action of its own weight directed downwardly and to the reaction of tightening the caps 16 directed upwardly. Consequently, the pivot joints of the pantograph must be generously dimensioned and can be formed by vertical spindles mounted in ball bearings, rollers or needles which, moreover, afford a total pivoting freedom to the bars around the spindles.

FIGURE 4 shows in detail the actuating member 45 for caps 16. This member comprises a double-acting jack 46 whose piston 47 is integral with a rod 48 traversing the small plate 38 on which this jack is fixed. The rod 48 penetrates into the bushing 19 of the cap 16 in which it is held by a pin 49 housed in a tangential hole 50 of the bushing and in a groove 51 of the rod. The small plate 38 also supports two columns 52 engaged in the journals 20 of the cap so as to guide the latter during the displacement of the piston 47.

The saws 6 and 7 are of circular shape and are placed in the same horizontal plane at a fixed distance above the tray 11. As can be particularly seen in FIGURE 5, each saw 7, for instance, is fixed by the usual means to the projecting end of a driving shaft 53. To this end, the shaft 53 is prolonged by a tray 54 on which the saw 7 rests and against which it is held by tightening a counter-tray 55. The shaft 53 of each saw is supported, by means of ball bearings 56 forming a stop, by a sheath 57 attached to a plate 58 integral with a slide 59. The latter has a projecting sole 60 dovetailed, whose sloping walls are in contact with a guide 61 and a trapezoidal slider 62 bearing on another guide 63. The guides 61 and 63 are fixed on a support 64 strengthened and integral with the frame 65 of the machine.

The slider 62 is provided in its middle part with a heel 66 traversing the support 64 and connected, for movement in one direction only, to a pneumatic cylinder 67 attached to the support 64. The rod 68 of the piston of this cylinder is pinned into a tubular part 69 surrounding the head 70 of a rod 71 integral with the heel 66 of the slider 62, this part bearing behind the head 70 so that the displacement of the piston is only transmitted to the rod 71 in the direction of the arrow f. In the position shown in solid lines in FIGURE 5, the cylinder 67 locks the slide 59, because the trapezoidal slider 62, by pressing on the guide 63 and the sole 60, tends strongly to press the vertical wall of the slide 59 against the guides 61 and 63. When the cylinder 67 is not fed pressure fluid, the part 69 occupies the position 69a shown by the hachured lines, and hence, totally releases the rod 71 so that the slider 62 no longer exerts any pressure on the sole 60 which, consequently, can slide.

It is necessary to be able to regulate the distance between centers of the saws symmetrically in ratio to the corresponding branch 26b of the trajectory 26, so as to enable saws of various diameters to be used or the cutting of water boxes of various widths. To this end, two nuts 72 and 73 are securely mounted in the slides 59 of the saws 7 and 6 respectively, the sole 60 of these slides delimiting a housing 74 of the corresponding nut. These nuts 72 and 73 are respectively screwed on to threaded parts 75 and 76 of a composite spindle 77 whose projecting end, guided in the frame 65, is prolonged by a manoeuvring square 78 (FIGURE 8). After releasing the cylinder 67, the spindle 77 can be revolved for opening or closing the nuts 72 or 73, and hence, moving the slides supporting the saws 7 and 6.

During the crosswise movement of the slides 59, the sheaths 57 corresponding to the saws 6 and 7 move in lengthened slots 79 made in the tray 11. Watertightness is ensured at both ends of each sheath by a joint 80 and a fixed labyrinth washer 81. The latter presses an elastic toric joint 82 against the end of a hollowed part 83, on the rim of the slot 79 in the tray 11 (FIGURES 3 and 5).

The lower end of each driving shaft 53 is keyed to one of the plates of a resilient coupling 84 whose other plate is keyed to the output shaft of an electric motor 85. This motor is fixed under a plate 86 integral with the slide 59 and parallel to the plate 58.

The trajectory 27 of the feeler 25 is imposed on the latter by a reproducing template 87 (FIGURES 6 and 7) adjustable for length. This template is made up of two slides 88 and 89 guided both in the same set of movable guides 90 and 91 arranged dovetail fashion. The guides are extended and fixed on a support 92 made integral with the upper part of the frame 65, which support is provided with members 93 for taking up play by the transverse displacement of the guide 91. An endless groove 94, shaped like the trajectory 27, i.e., rectangular, with rounded corners, is cut deeply into the slides 88 and 89. The latter are able to be displaced toward or away from each other, but in order to eliminate any discontinuity in guiding the feeler 25 by the walls of the groove 94 of said slides, the contiguous faces 95 and 96 of the latter are additionally cut at 97 and 98 to half the depth of the groove, so that these slides always return no matter what their stroke.

The symmetrical displacement of the slides 88 and 89 is controlled by a compound screw 99, penetrating into the nuts 100 and 101 fixed to and under the slides by screws 102 (FIGURE 6). The screw 99 is connected to an extender 103, held crosswise and rotatively guided in a journal 104 outside the machine. This extender is provided with a manoeuvring square head 105 and subjected to the control of a locking bolt 106. Thus, by revolving the screw 99 in one direction or the other, the slides 88 and 89 of the template 87 are moved to the same extent and in opposite directions, which has the effect of lengthening or shortening the large dimension of the latter. The displacement of the slides is limited, to correspond with their return area, by stops 107 attached to the support 92 on either side of the nuts 100 and 101.

As can be seen from FIGURES 3 and 6, the frame 65, by means of a welded framework 108 placed towards the rear, supports an electric motor 109 coupled to reducing gear 110. The output shaft 111 of the latter is keyed to one of the plates of an electro-magnetic clutch 112, the other plate of this clutch cooperating with an electro-magnetic brake 113, for controlling the drive of the principal shaft 114 of the machine. The free end of the shaft 114, supported by bearings 115 mounted in a sleeve 116 of the framework 108, emerge in a gear box 117. The latter comprises a tapered pinion 118, keyed and fixed on this end of the shaft 114, and another tapered pinion 119 meshing with the first one, pinion 119 being locked on a fluting 120 of a gear shaft 121. The box 117 is provided with tight-fitting ball bearings 122 and 123 of which at least one forms a stop, so as to support and properly guide the gear shaft 121, whatever the load. 124 denotes a lubricating opening cap for the gear box 117 and 125 is a tight-fitting inspection port.

The end of the shaft 121 emerging under the gear box 117 is shaped as a tightening cone 126 for a crank 127 which is keyed and fixed on this cone by means of a key 128 and a screw 129. This crank delimits a slot 130 for the radial guiding of a roller 131 rotatably mounted on one of the ends of a spindle 132, which is engaged and held in a bushing 133 integral with the tubular bar 41 of the pantographic machine 17. The other end of this spindle supports another roller 134 able to revolve in the guiding groove 94 of the adjustable template 87. The spindle 132 and rollers 131, 134 form the feeler 25 of the pantographic machine.

When the motor 109 rotatively drives the secondary shaft 121 by the kinematic chain described above with reference to the parts 110 to 119, the crank 127 keyed on to that shaft rotatively drives the feeler 25 of the pantographic machine 17 at an appreciably regular angular speed. Then the roller 134 of said feeler revolves in the groove 94 of the template 87, but the trajectory described by this roller not being circular, it follows that the roller 131 moves in the radial slot 130 of the crank 127 during the rotating of the shaft 121.

Furthermore, the upper end of the shaft 121, emerging from the box 117, is made integral, by any suitable means, with a finger 135 for controlling the various operating functions of the machine subject to the rotation of the secondary shaft 121. To this end, the framework 108 supports a circular table 136 (FIGURES 3 and 6) centered on the secondary shaft 121, this table being made to overhang at a level higher than that of the members previously described, to allow the passage of the pantographic machine 17 and saws 6 and 7. The upper projecting end of the shaft 121 passes through a circular opening 137 made in the table, so that the finger 135 revolves over said table.

Three small control plates 138 are fixed at different angular positions on the table 136 (FIGURE 3) for controlling the control circuits of the various mechanisms of the machine. Each small plate supports a member 139 (FIG. 9) which can be either an electric switch or control contact-piece, or an electrovalve, or any other controlling equipment known per se. The members 139 and then 139a, 139b are actuated by one of the arms of a bell lever 140 pivotally mounted on a spindle 141 carried by the small plate 138. This lever arm is subjected to the action of a resilient member 142 hooked on to said small plate and tending to actuate the member 139, the pivoting of the lever in that direction being limited by a stop 143. The other arm 140a of the bell lever 140 encroaches on the area 144 swept by the finger 135, so that when this finger passes, the lever 140 pivots around the spindle 141 in the direction of the arrow $f_2$ for releasing the actuating element of member 139.

The plates 138 are movable on the table 136 guided by spurs 145 penetrating into a circular groove 145a made in the latter. Thus, by shifting the spurs in the groove, the angular position of the corresponding plate 138 is changed, while maintaining the plate radially disposed with respect to the table. Each plate is fixed on the table 136 by screws 146, but to accurately regulate the sequence of the various operations it may be necessary to shift the plates 138 slightly, and to this end, the screws 146 are placed in curved slots 147 concentric to the axis of the table.

The entering and evacuating runways 3 and 8 are arranged on a box shaped frame 148, connected to the frame 65 of the machine so that the upper platform 149 of frame 148 is placed in the same plane as the tray 11. Lateral guides 150 and 151, FIG. 3 are mounted on the platform 149 and tray 11, the distance separating these guides corresponding to the width of the soles 10 of the shoes 2. These guides delimit a passage forming the entrance way 3 whose entry 152 is flared, by bevel cutting the guide 151, to facilitate the engaging of the shoes in said way.

On the tray 11, and at the exit of the entrance way 3 a retractable stop 153 is mounted, determining the position of the first shoe $2_1$ when it comes along, so that the cap 16 supported by the pantographic machine 17, is able to engage this first shoe provided with a water box. The retractable stop 153, guided by a part 153a attached to the tray 11 is subjected to the action of a jack 154 (FIGURE 3) mounted in a support 155 integral with the frame 65, this jack tending to bring the stop 153 opposite to the exit from the entrance way 3 or to remove it.

As can be particularly seen in FIGURES 3 and 11, a slot 156, surrounded by a part 157, is hollowed out in the platform 149 to guide a push-rod or finger 158, shown in solid lines for the starting position of the entry stroke of a shoe and in hachured lines in FIGURE 3 for the end of the stroke position. The push-rod 158, during its active sliding in the direction of the arrow $f_3$, acts on the shoe $2_1$ which has just been put on by an operator, so that this shoe thrusts the whole line of shoes placed on the entrance way 3, and this, step by step to place the first of these shoes against the retractable stop 153.

The control of the push-rod 158 takes place in the following way: the under-frame 148 is provided with hangers 159, 160 and 161, respectively supporting a double pinion 162, 163, a pinion 164 and another pinion 165. On the pinions 163 and 164 an endless chain 166 is wound whose bottom strand is gripped by a strap 167 fixed to the end of the piston of a double-acting jack 168. Likewise, on the pinions 162 and 165 an endless chain 169 is wound whose upper strand is gripped by a strap carriage 170 carrying the push-rod or finger 158 projecting upwards. The chain transmission device, interposed between the push-rod 158 and jack 168, enables a stroke of said push-rod to be obtained that is the multiple of that of the jack 168. According to the arrangement of the members adopted for the form of embodiment shown, the displacement in one direction (arrow $f_4$ for example) of the piston of the jack 168 causes a displacement in the opposite direction of the push-rod 158 (arrow $f_3$).

Moreover, the guide 151 cooperates with another guide 171, attached to the platform 149, for delimiting a guide passage for the shoes $2_2$ but provided with water boxes that have just been cut at the point 5. This passage, whose access is facilitated by a lateral sloping ramp 172 cut in the guide 151, forms an evacuation way 8 for the end products. As shown by FIGURES 3 and 10, the tray 11 delimits a groove 173 for guiding a slider 174 extended by a scraper 175 which overlaps the upper level of the tray 11, so that during the sliding in the direction of the arrow $f_5$ of the slider 174, the shoe $2_2$ coming from the point 5 is carried towards the evacuation passage 8. The free end of the slider 174 is fixed, by any suitable means, on an angle-iron 176 placed in a slot 177 made in the platform 149. 178 denotes a double-acting jack whose piston is fixed to the angle iron 176. Then, the displacements of this piston in one direction or the other are directly transmitted to the scraper 175.

On the guides 151 and 171 there is a shaped steel part 179, comprising two ascending sloping ramps 180 and 181, symmetrically placed in relation to the axis of the evacuation passage 8 and so as to come into contact with the cut edges of the water boxes 1. During the evacuation stroke of the shoes $2_2$, the water box 1, supported by the first shoe and coming from the point 5, is raised by sliding along the ramps 180 and 181. As soon as this box is completely disengaged from the shoe it is taken over by the following box which thrusts the first box on to an ascending and turning track 182 delimited by the part 179. Step by step, the water boxes push each other until the first box falls from the track 182 into a basket which is then moved to a storeroom or another work point. In parallel, the discharged shoes $2_2$, are thrust step by step towards the storage area 9, from which the operator removes them to place them on the entrance way 3 and then cover them with a part 1 to be cut.

FIGURE 10 also shows that the platform 149 rests at one of its ends, on the rim 183 of a gutter 184 surrounding the tray 11 and that this platform is supported, at the other end, by at least one prop 185 adjustable for height. The platform 149 then supports the caisson 186 of the underframe 148 (FIGURE 12).

The saws 6, 7 are copiously sprayed with a cutting liquid. The liquid, spread over the tray 11 flows through the gutter 184 without being able to penetrate into the slots 79 of the tray, which are made water-tight by joints 82. This peripheric gutter communicates with a container 187 hollowed out in the frame 65 of the machine. An overflow pipe 188 (FIGURE 12) is fixed to the bottom of the container 187, so that the entrance to this pipe is situated above the bottom, to enable a first filtering of the filings produced by the saws and carried along by the liquid.

The liquid, flowing in the direction of the arrow $f_6$ in the pipe 188, traverses a filter 189 before reaching and filling a tank 190 delimiting several decantation compartments 191, 192 and 193 whose levels are different to enable decanting from one to the other without carrying along any foreign bodies. A pump (not shown) sucks up the liquid contained in the compartment 193 for redelivery to the saws 6 and 7.

Also, the rim 183 of the gutter 184 is partly eliminated in the place connecting the platform 149 to the tray 11. In this way, the liquid collected by the gutter 184 can also flow in the direction of the arrows $f_7$ and $f_8$ towards a drain 194 emerging in a pouring spout 195 which is delimited, as well as the drain, by the caisson 186. The latter also receives the lubricating liquid trickling across the slots 156 and 177 of the platform 149 (arrow $f_9$). The outlet of the spout 195 is placed over a filter 196 mounted on a decanter 197 which communicates at its upper part, by means of a flexible pipe 198, with the first decanting compartment 191 of the tank 190. The liquid flows in the direction of the arrows $f_7$, $f_8$, $f_9$, then $f_{10}$, $f_{11}$ and $f_{12}$.

FIG. 13 is a diagram illustrating the controlled elements shown in FIG. 3 and the inter-relation between these controlled elements and the control mechanism having the finger 135 for actuation of the members 139. For clarity, the inter-relation is diagrammed by single lines since such inter-relation may be either electrical or hydraulic connections.

The cutting machine operates in the following manner from the position shown in FIGURE 3:

Energized by the member 139 and the circuit $a$, the jack 154 controls the withdrawal of the retractable stop 153, while the jack 46, supported by the small plate 38 of the pantographic machine 17 which is stopped, controls the descent of the cap 16 so that the latter covers the water box 1, placed on the first shoe $2_1$ on the entrance way 3, and holds this box on said shoe.

At this moment, the clutch 112 and electro-magnetic brake 113 are operated by the circuit $a_1$ for ensuring the coupling up of the reducing gear 110, driven by the motor 109, with the main shaft 114. This latter rotatively drives, by a pair of tapered pinions 118 and 119, the secondary shaft 121, and hence, the finger 135 and crank 127. In its turn, the crank rotatively drives the roller 131 of the feeler 25, which is connected to the bar 31 of the pantographic machine 17 at a constant angular speed. But the roller 134 of said feeler being guided in the rectangular groove 94 of the reproducing template 87, the shoe 2, driven by the member 45, describes a homothetic trajectory 26 by sliding on the tray 11. During the first part $26a$ of this trajectory, the saw 6 cuts one of the small sides of the water box 1, then, during the following part $26b$ of this trajectory, the two saws 6 and 7 make the simultaneous cut of the two large sides of the box; lastly, during the third part $26c$ of this trajectory, the saw 6 makes the cut of the small side of the box.

During the cutting, the retractable stop 153, thrust by the jack 154 energized from the member $139a$ and through the circuit $a_2$, has returned to its original stop position and the push-rod 158 actuated by the jack 168 and by means of the chain transmission 166 and 169 also energized by the circuit $a_2$, thrusts—in the direction of the arrow $f_3$— the shoe that has just been put on by the operator, so that the first shoe of the entrance way 3 comes into contact with the retractable stop 153. Parallel to this last operation, the scraper 175, integral with the scraper 174, is moved in the direction of the arrow $f_5$, by the jack 178 also energized by the circuit $a_2$. Consequently, the shoe $2_2$, carrying a cut water box, is moved by this scraper towards the evacuation passage 8 which means that the water box is raised by the sloping ramps 180 and 181 onto the ejection track 182 for end products, while the discharged shoes are thrust, step by step, in to the passage 8 towards a storage area 9. The operator then takes shoes from that area for supplying the entrance way 3.

As soon as the push-rod 158 and scraper 175 reach the end of the stroke, the jacks 168 and 178 are operated in the reverse direction for effecting the return of the push-rod and scraper to their original positions, shown by solid lines in FIGURE 3.

The cutting is completely finished when the shoe is situated in the middle area of the part $26c$ of its trajectory. At this point, the shoe faces the evacuation way 8, so that the jack 46, supported by the pantographic machine, is actuated from the member $139b$ and the circuit $a_3$ for controlling the raising of the cap 16, and hence, to release the corresponding shoe 2, which stops on the spot, whereas the cap is moved along by the pantographic machine, following the remainder of the parts $26c$ and $26d$ of the trajectory.

When the cap comes above the first shoe $2_1$ then waiting on the entrance way 3, the feed of the clutch 112 and electro-magnetic brake 113 is cut off by the member 139, so as to uncouple the motor 109 from the main shaft 114, lock the latter and also stop the cap 16, but the same operations forming a cycle are repeated until the machine is completely stopped by opening the master switch.

The precise control of the clutch 112, the brake 113 and the jacks 46, 154, 168 and 178 is ensured, as described, by placement of plates 138 for proper timed engagement on the passage of the finger 135. The saws 6 and 7 revolve as soon as the machine is started up and without stopping between each cycle.

Various modifications can moreover be applied to the form of embodiment shown and described in detail, without going outside of the scope of the invention.

I claim:

1. A machine for cutting the lower portions of water boxes for radiators after stamping of said water boxes comprising a plane table, guides extending parallel on said table defining two pasageways, support members slidably movable in said passageways for seating the water boxes, said members having a substantially rectangular shape and being located side by side in one passageway forming an entrance way, a pushing device having reciprocating motion provided in said entrance way to engage the support members, a similar pushing device in the other passageway engaging said support members for evacuation thereof and of the cut water boxes they carry, a set of two disc shaped rotating saws horizontally disposed above said table and continuously driven, a shape reproducing device mounted above said table, a driving motor operatively engaged with said reproducing device to drive thereof, a vertically movable cap carried by said reproducing device, actuating means operating said cap to engage successively said water boxes fitted on said support members and to release said water boxes at the end of each cycle of movement of said reproducing device, and a template member having a contour homothetic to said water boxes and which is engaged with and controls the movement of said reproducing device and a control mechanism having a rotatable element and fixedly mounted control members successively engaged by said rotatable element driven by said driving motor, said control members having inter-connection with said pushing device of the entrance way, with said pushing device of the passageway for evacuation, with said driving motor and with said actuating means operating said cap so that when said cap has engaged a water box in the entrance way the water box is moved transversely in one direction and one end of the box is cut by one of said saws, the template guiding the reproducing device and cap so as to move the grasped water box longitudinally between the two saws for cutting the lateral sides of the box, and to finally move the grasped water box transversely in the opposite direction to cut the second end of the box, said cap releasing the grasped box in the entrance of the second passageway.

2. A machine as set forth in claim 1 wherein said reproducing device comprises a pantograph having a set of pivotally mounted arms one of which is provided with a feeler member and said template is rectangular and adjustable in size.

3. A machine as set forth in claim 1, comprising further a set of ascending sloping ramps disposed in said second passageway, said ramps engaging the cut water boxes to disengage them from the support members.

References Cited by the Examiner

UNITED STATES PATENTS

| 301,566 | 7/84 | Coles | 83—410 |
| 1,656,755 | 1/28 | Palmer | 83—507 |
| 1,818,836 | 8/31 | Arnold | 83—410 |
| 2,733,701 | 2/56 | Brady | 90—62 |
| 3,058,380 | 10/62 | Leibinger | 83—410 |

FOREIGN PATENTS

| 121,296 | 6/01 | Germany. |

ANDREW R. JUHASZ, *Primary Examiner.*

WILLIAM W. DYER, CARL W. TOMLIN, *Examiners.*